(No Model.) 10 Sheets—Sheet 1.
G. E. HAIGHT & W. H. WOOD.
SUBMARINE TORPEDO BOAT.
No. 339,096. Patented Mar. 30, 1886.
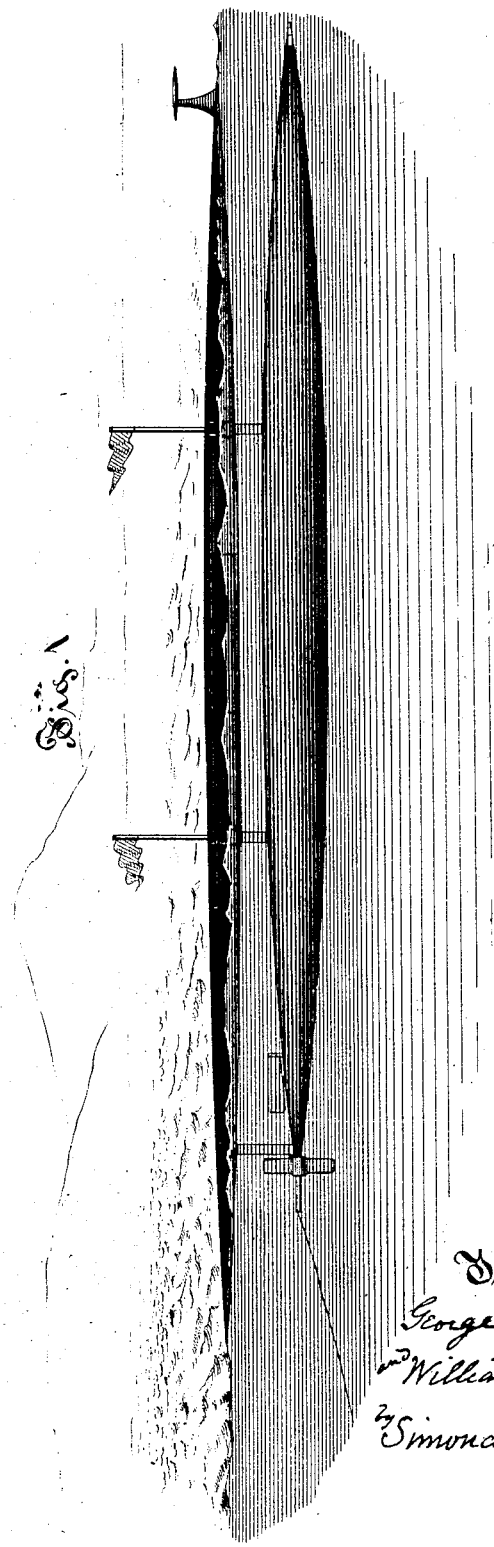
Witnesses,
W. M. Bjorkman,
A. G. Heyfman.
Inventor,
George E. Haight
William H. Wood
by Simonds & Burdett,
Attys.

(No Model.) 10 Sheets—Sheet 2.
G. E. HAIGHT & W. H. WOOD.
SUBMARINE TORPEDO BOAT.
No. 339,096. Patented Mar. 30, 1886.
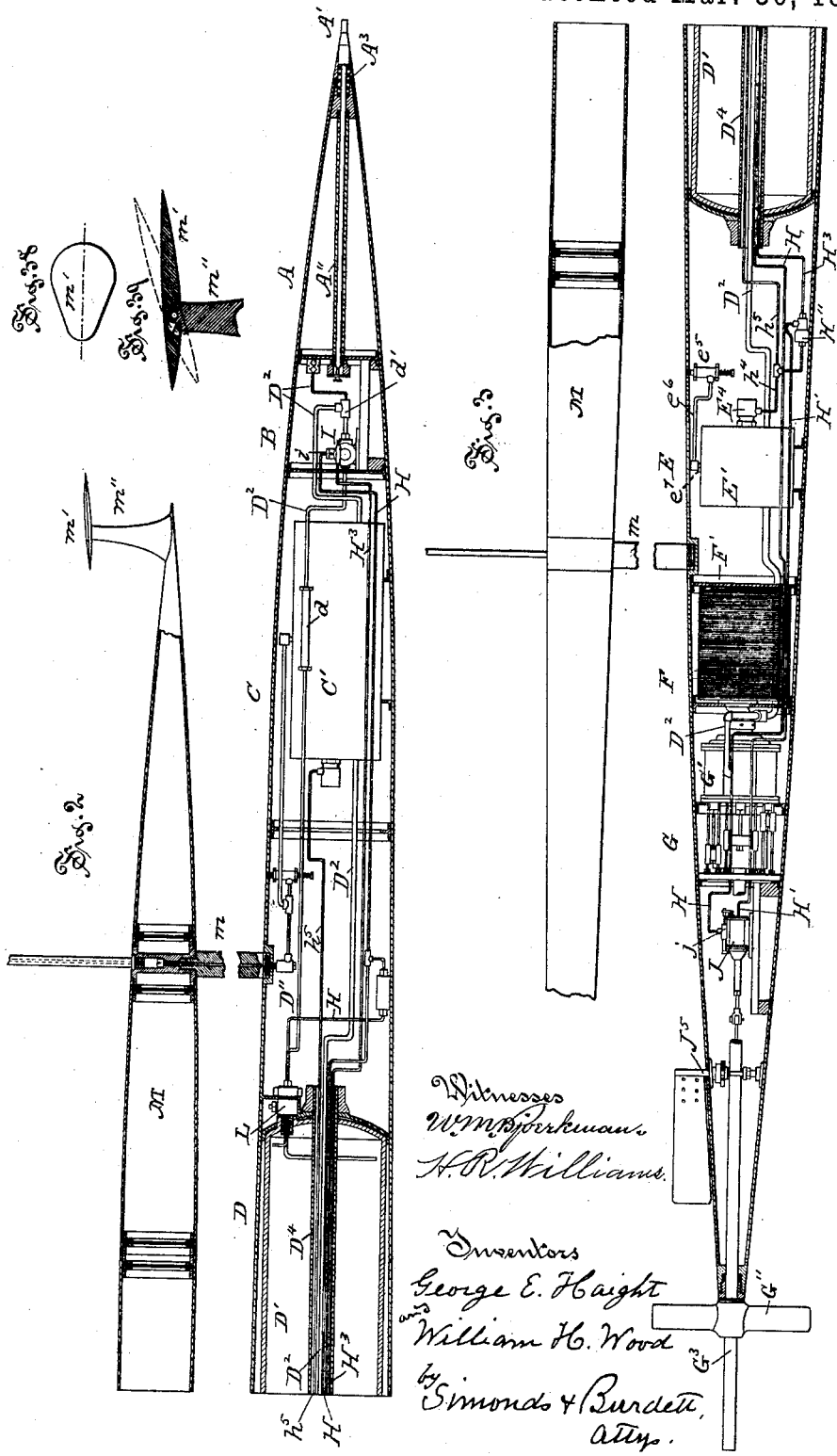

(No Model.) 10 Sheets—Sheet 3.
G. E. HAIGHT & W. H. WOOD.
SUBMARINE TORPEDO BOAT.
No. 339,096. Patented Mar. 30, 1886.
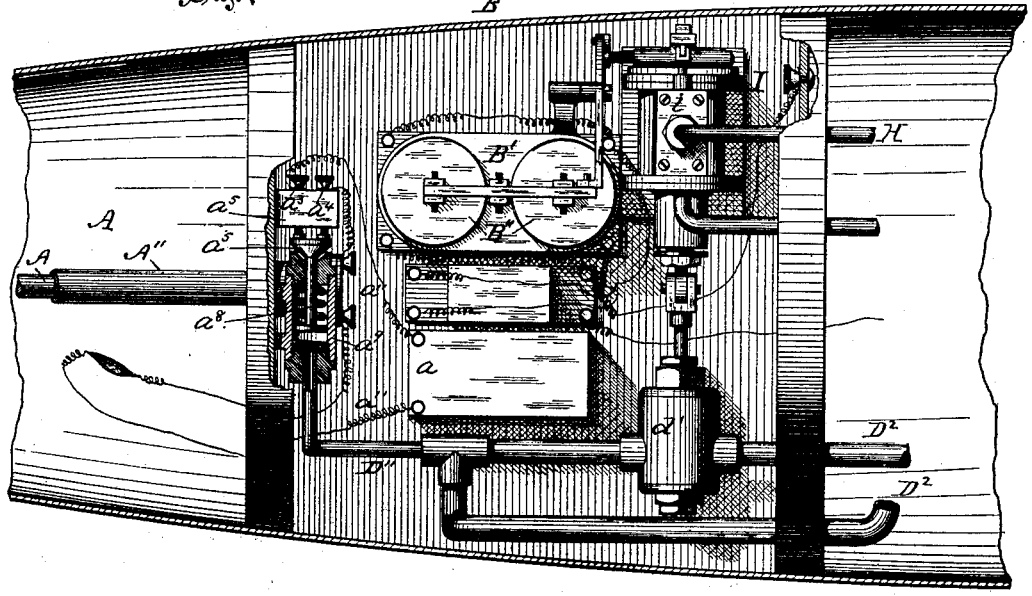
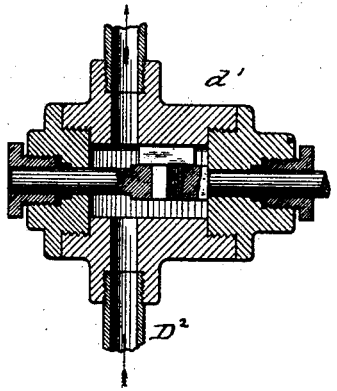
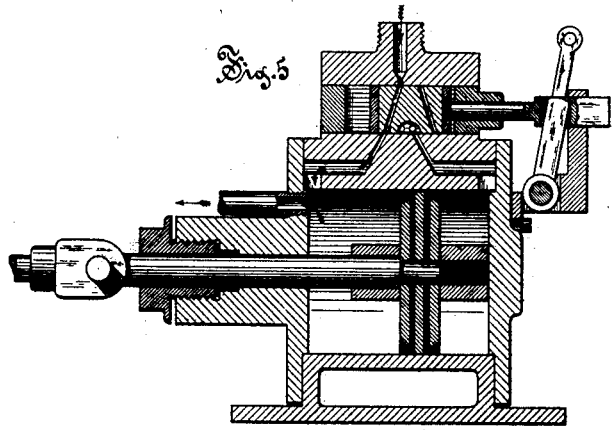

(No Model.) 10 Sheets—Sheet 4.
G. E. HAIGHT & W. H. WOOD.
SUBMARINE TORPEDO BOAT.
No. 339,096. Patented Mar. 30, 1886.
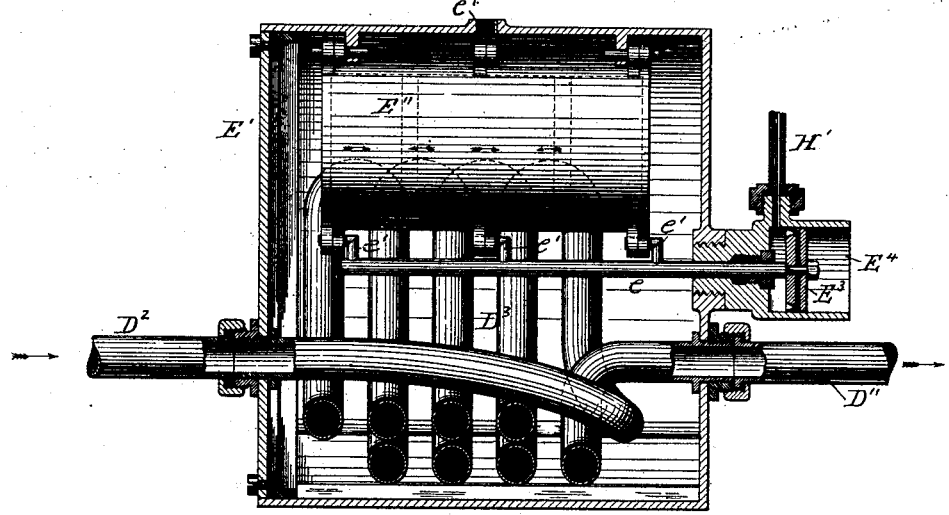
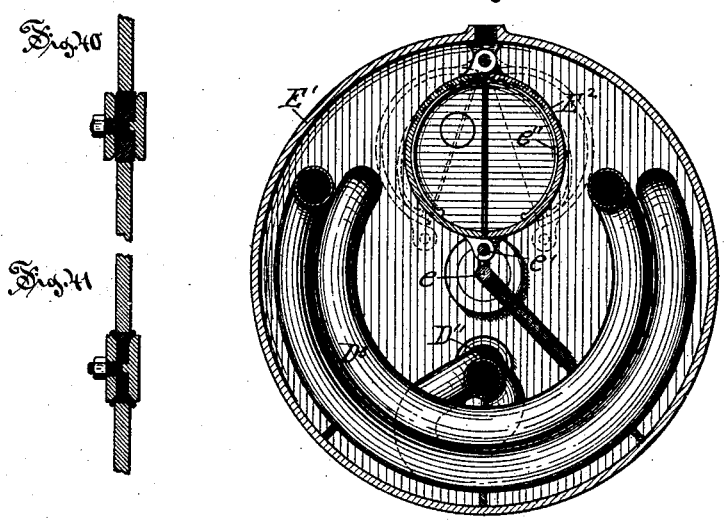

(No Model.)
10 Sheets—Sheet 5.
G. E. HAIGHT & W. H. WOOD.
SUBMARINE TORPEDO BOAT.
No. 339,096. Patented Mar. 30, 1886.
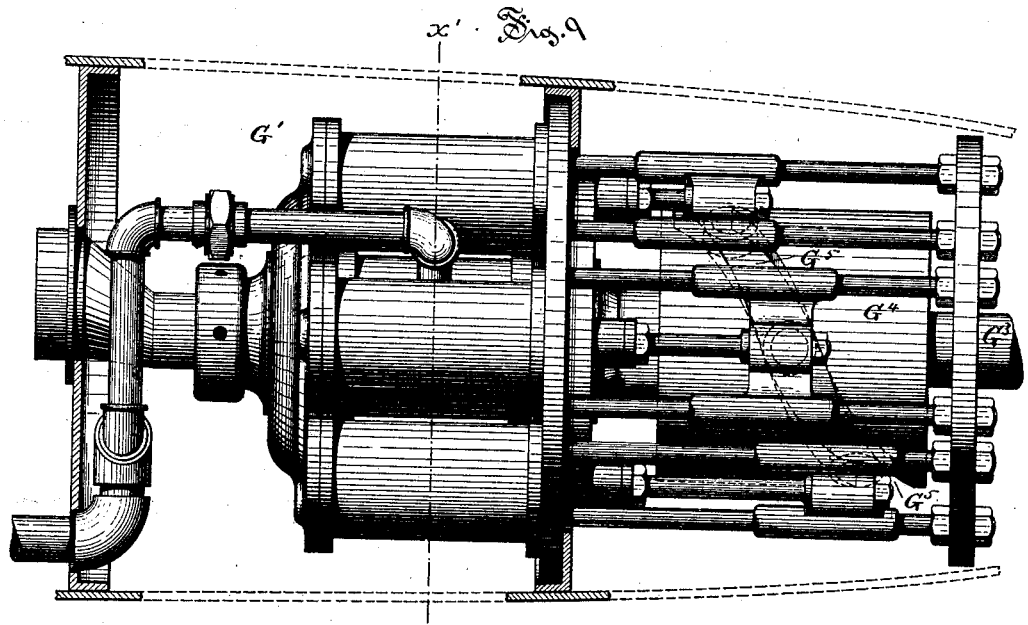
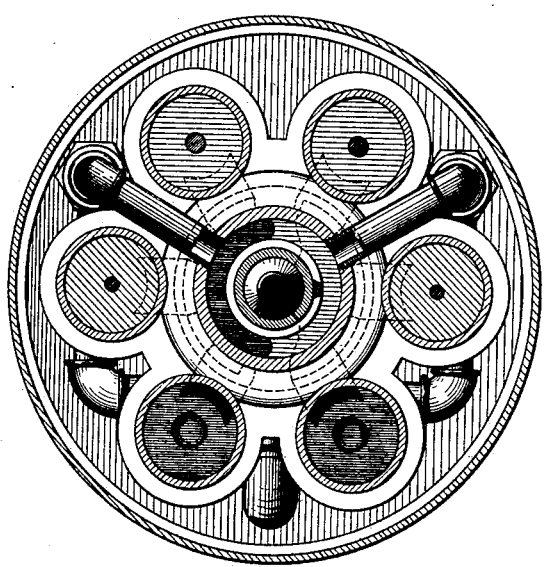

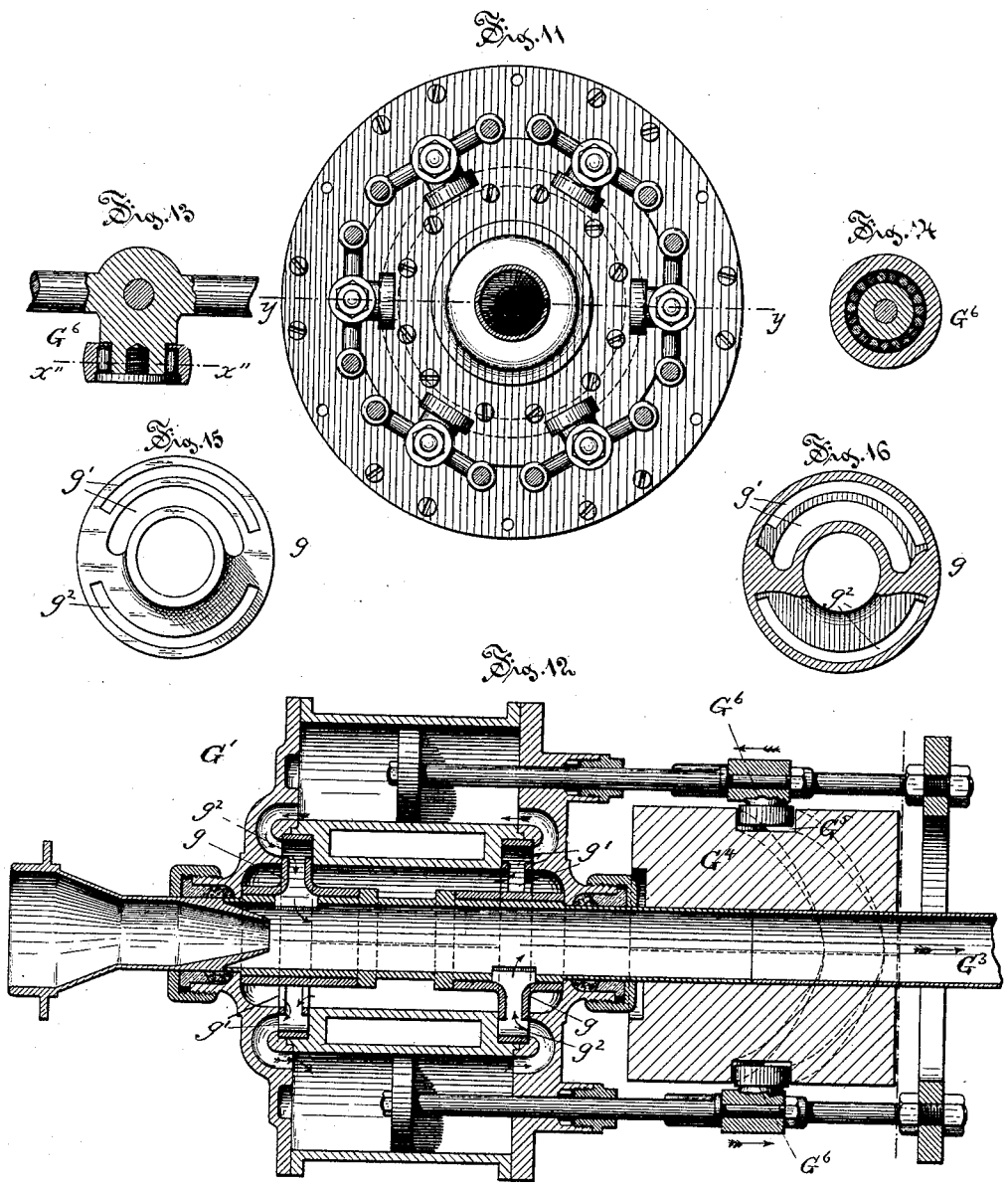

(No Model.) 10 Sheets—Sheet 7.
G. E. HAIGHT & W. H. WOOD.
SUBMARINE TORPEDO BOAT.
No. 339,096. Patented Mar. 30, 1886.
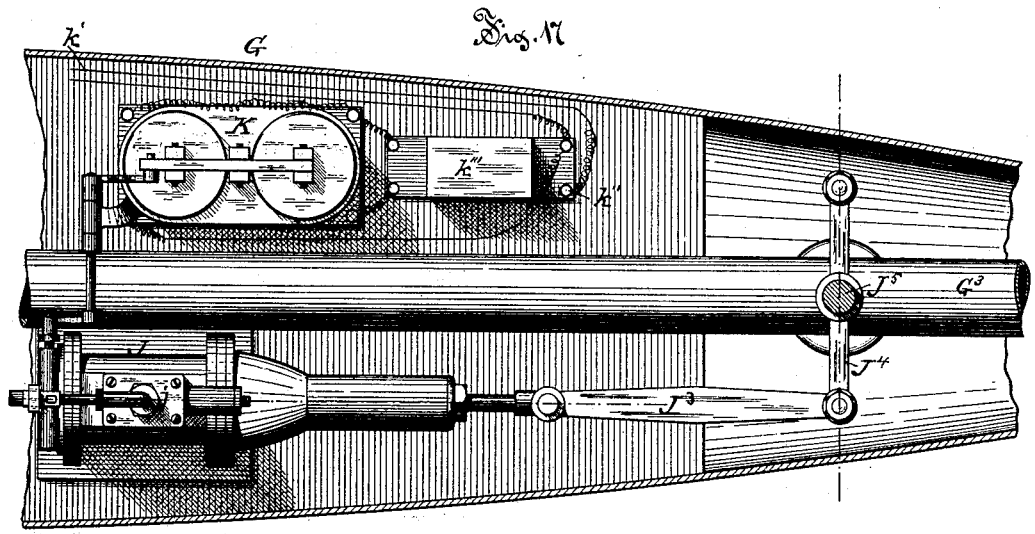
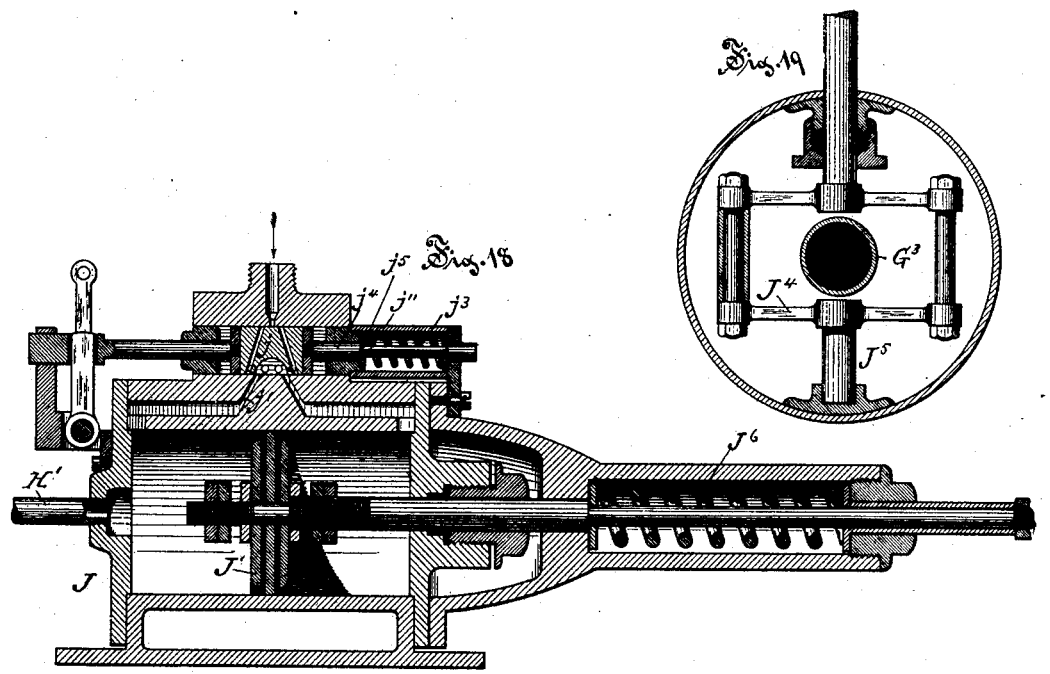
Witnesses
W. M. Björkman
H. P. Williams
Inventors.
George E. Haight and
William H. Wood
by Simonds & Burdett,
Attys (No Model.) 10 Sheets—Sheet 8.
G. E. HAIGHT & W. H. WOOD.
SUBMARINE TORPEDO BOAT.
No. 339,096. Patented Mar. 30, 1886.
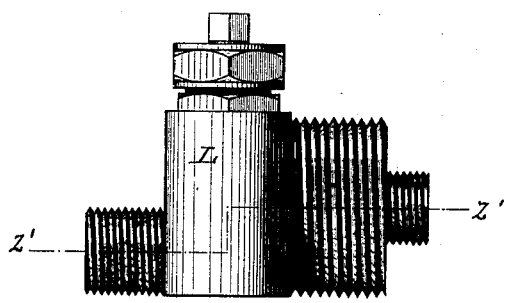
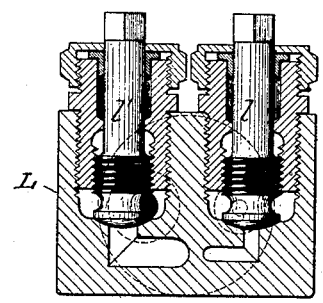
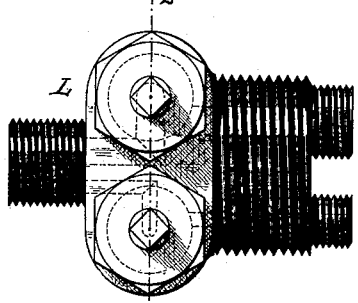
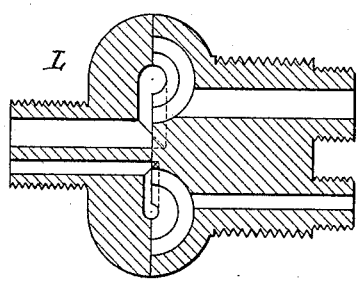
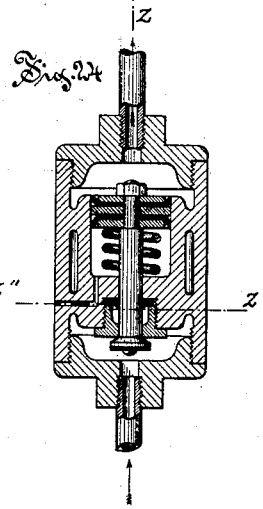
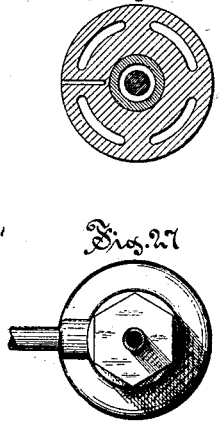
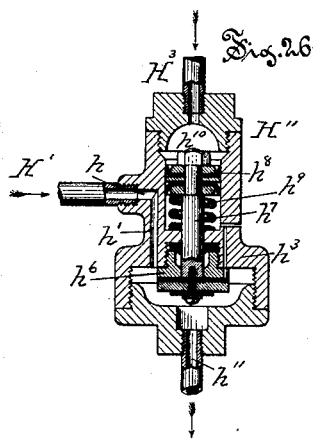

(No Model.) 10 Sheets—Sheet 9.

G. E. HAIGHT & W. H. WOOD.
SUBMARINE TORPEDO BOAT.

No. 339,096. Patented Mar. 30, 1886.

Witnesses
W. M. Bjorkman
H. R. Williams

Inventors.
George E. Haight and
William H. Wood
by Simonds & Burdett,
Attys.

(No Model.) 10 Sheets—Sheet 10.
G. E. HAIGHT & W. H. WOOD.
SUBMARINE TORPEDO BOAT.
No. 339,096. Patented Mar. 30, 1886.
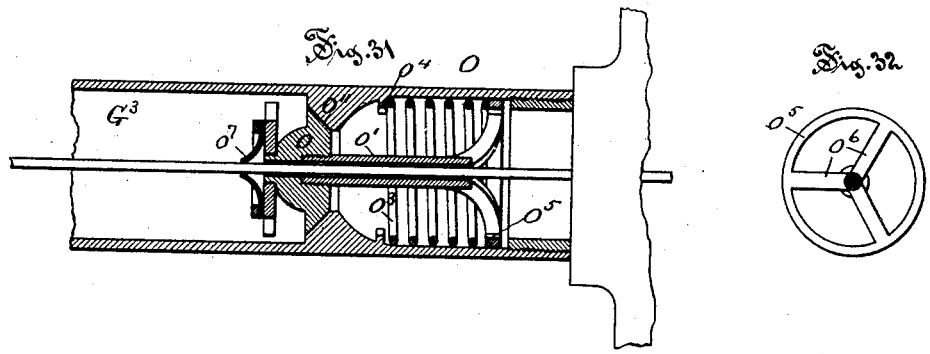
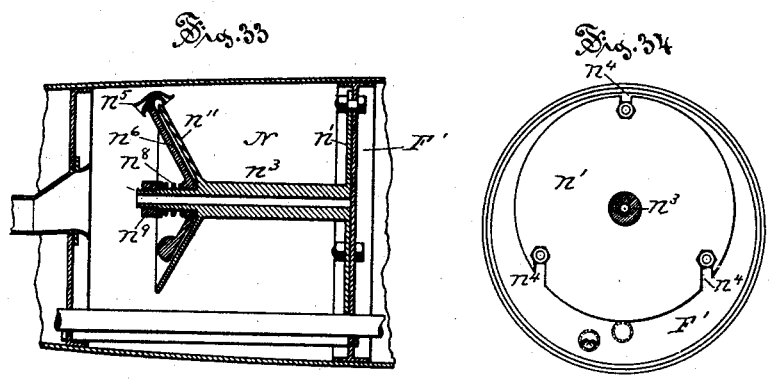
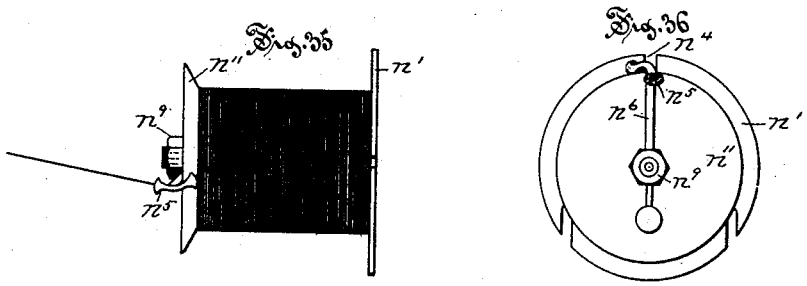
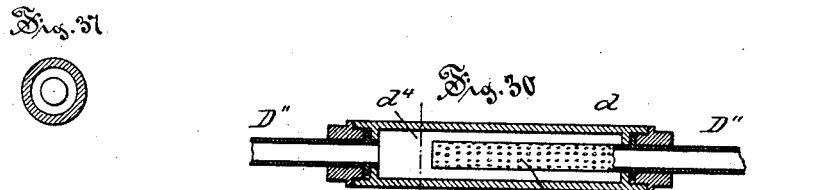
Witnesses
W. M. Bjoerkman
A. G. Heyman
Inventors
George E. Haight and
William H. Wood
by Simonds & Burdett,
Attys.

UNITED STATES PATENT OFFICE.

GEORGE E. HAIGHT, OF NEW HAVEN, AND WILLIAM H. WOOD, OF HARTFORD, CONNECTICUT.

SUBMARINE TORPEDO-BOAT.

SPECIFICATION forming part of Letters Patent No. 339,096, dated March 30, 1886.

Application filed November 2, 1885. Serial No. 181,736. (No model.)

*To all whom it may concern:*

Be it known that we, GEORGE E. HAIGHT, of New Haven, New Haven county, State of Connecticut, and WILLIAM H. WOOD, of Hartford, Hartford county, in said State, have invented certain new and useful Improvements in Submarine Torpedo-Boats, of which the following is a full, clear, and exact description, reference being made to the accompanying drawings, where—

Figure 28:
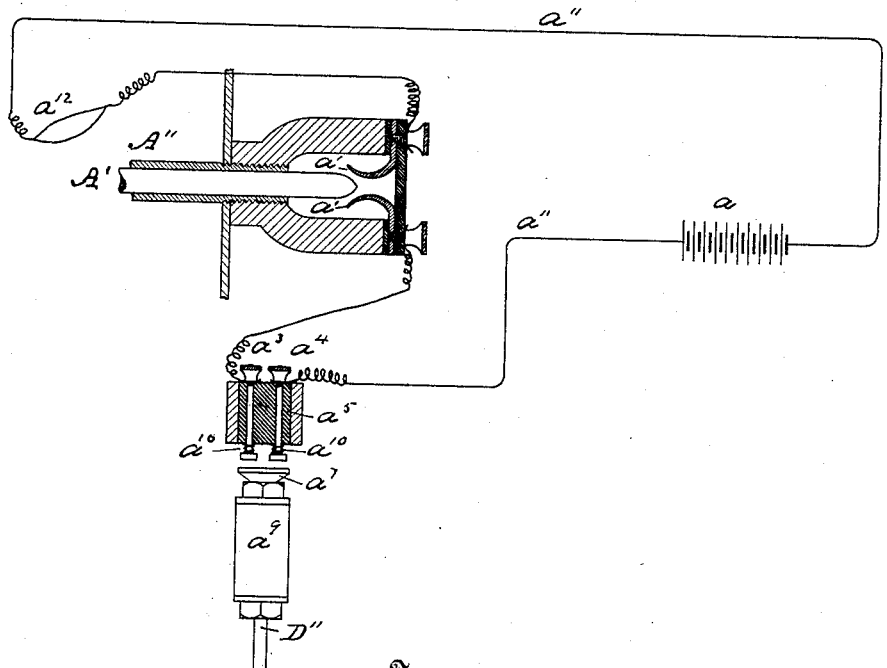
Figure 29:
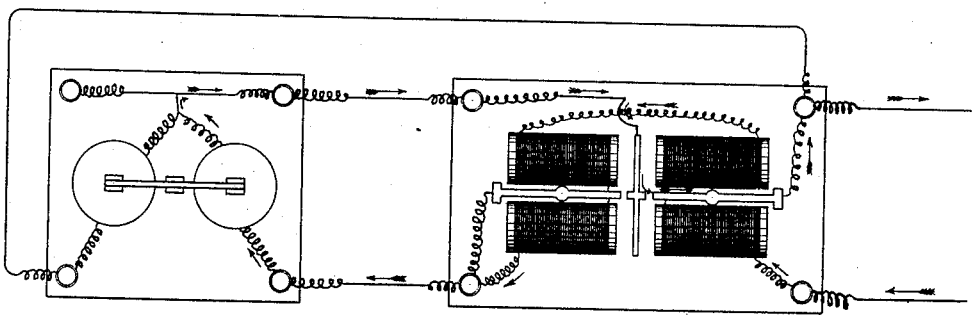

Figure 1 is a side view of our submarine torpedo-boat, illustrating its position in the water. Figs. 2 and 3 are views in longitudinal vertical central section of the boat and the float, showing the devices in the several compartments from bow to stern. Fig. 4 is a detail plan view, on enlarged scale, of the several valves and the electrical apparatus in the bow compartment next back of the magazine, the hull of the boat being cut away in horizontal section. Fig. 5 is a detail view, on enlarged scale, in central longitudinal section, of the cylinder for operating the throttle-valve. Fig. 6 is a detail view, on enlarged scale, in central section, of the throttle-valve. Fig. 7 is a detail view, on enlarged scale, in central vertical longitudinal section, of one of the gas heating and expanding chambers. Fig. 8 is a detail view on plane $x$ $x$ of Fig. 7, in cross-section, of the same chamber. Fig. 9 is a detail top or plan view of the engine used to propel the boat. Fig. 10 is a detail view in cross-section of the boat and engine on a plane denoted by the line $x'$ $x'$ in Fig. 9. Fig. 11 is a detail end view of the cylinder-head and piston-rods. Fig. 12 is a view in horizontal central section of the engine on plane denoted by line $y$ $y$ of Fig. 11. Fig. 13 is a detail view of the end of one of the piston-rods, showing the anti-friction roller. Fig. 14 is a detail view in section, on plane $x''$ $x''$ of Fig. 13, through the anti-friction roller. Fig. 15 is a detail end view of one of the rotary valves. Fig. 16 is a detail view in central cross-section of the rotary valve. Fig. 17 is a plan view of the propeller-shaft, the steering-cylinder, and the electrical apparatus, showing the relative arrangement of these parts in the compartment of the boat. Fig. 18 is a view on enlarged scale, in central vertical section through the steering-cylinder, on plane $x^3$ $x^3$ of Fig. 17. Fig. 19 is a view in cross-section of the boat and shaft through the rudder-post on plane $x^4$ $x^4$ of Fig. 17. Fig. 20 is a detail side view, on enlarged scale, of the main valve of the storage tank or reservoir of liquefied gas. Fig. 21 is a top view of the same. Fig. 22 is a view in cross-section of the same on plane denoted by line $z$ $z$ of Fig. 21. Fig. 23 is a view in longitudinal section of the valve on plane denoted by line $z'$ $z'$ of Fig. 20. Fig. 24 is a detail view in central longitudinal section of the pressure-reducing valve. Fig. 25 is a view in cross-section of the same on plane $z''$ $z''$ of Fig. 24. Fig. 26 is a detail view in longitudinal section of the safety-valve of the heating-chamber. Fig. 27 is a top view of the same. Fig. 28 is a diagram view of the firing and safety devices and electrical connections with the local battery. Fig. 29 is a diagram view of the electro-magnet relay and connections of the valve-operating apparatus. Fig. 30 is a detail view in central longitudinal section of the strainer on the pipe for liquid passing from the reservoir. Fig. 31 is a detail view in central section of the outer end of the exhaust-pipe, showing the stop-valve that prevents the ingress of water. Fig. 32 is a detail view of the back of the valve-stem and in cross-section of the pipe. Fig. 33 is a detail view in longitudinal section of the reel-chamber of the boat, showing the reel also in section. Fig. 34 is a view in cross-section of the reel-chamber and reel. Fig. 35 is a detail side view of the reel and coil, with the device for unwinding the cable. Fig. 36 is a detail end view of the reel, showing the flier. Fig. 37 is a view in cross-section of the strainer. Fig. 38 is a plan view of the drag on the bow of the float. Fig. 39 is a view on enlarged scale, in central vertical section, of the drag. Figs. 40 and 41 are detail views in section of the plug used to close the hand-hole in the lime-tube.

Our invention relates to the class of submarine torpedo-boats of the type that is controlled in its movement from a point without the boat and connected with it by an electric conductor; and our improvement consists in the devices for submerging the boat to insure its safety from projectiles; in the means for keeping the boat on an even keel; in the details of the construction of the engine by which the boat is moved; in the devices for securing safety in handling the boat when charged; in the automatic device for mixing the chemicals used to heat and expand the gas used as a motive power, and in details of the construction and combination of the several parts of the boat and its contents, as more particularly hereinafter described.

In general outline the boat is circular as to cross-section, and it tapers toward the bow and stern on lines preferably curved from end to end of the boat, the ends being sharply pointed, and the hull is made of any suitable material, as iron, steel, or copper, the latter being preferable. The interior of the boat is divided by suitable bulk-heads into a number of chambers or compartments; and in the accompanying drawings, where like letters indicate the same parts throughout, the letter A denotes the bow compartment or magazine, which contains the charge of explosive material or compound. B, the next chamber in order toward the stern of the boat, contains a local battery for firing the charge, the safety device in this battery-circuit that prevents the accidental firing of the charge, the valves for starting and stopping the engine, and the electrical devices for operating the valves. C, the next compartment, contains a gas heating and expanding chamber; D, the storage-reservoir of compressed liquefied carbonic-acid gas; E, another gas-heating and expanding chamber; F, the cable-chamber, which contains the coil of insulated wire by means of which the boat is held and guided from the firing-point. G, the next, contains the engine, the steering device, and the electrical apparatus for controlling the movements of the rudder. The motive power used in this boat is a gas stored in a liquid form under great pressure in the flask or reservoir D', and from there the liquid is conducted by pipes through heating and expanding chambers to the engine G', that drives the propeller G'', that is fast to the hollow shaft G''', which extends beyond the stern of the boat in line with the axis.

The special means for conducting the liquid from the reservoir to the expanding-chamber, so as to prevent freezing, is substantially the same as that shown and described in the United States patent to Haight, dated May 9, 1882, No. 257,694. The liquid is conveyed from the flask D', by the pipe D'', through the strainer $d$ to the throttle-valve $d'$, thence to the coil in the heating and expanding chamber C', thence back through a pipe passing through the open pipe $D^4$, through the flask to the coil of pipes in the other heating-chamber, E', where it is further expanded into gaseous form, and is finally led into the induct or supply pipes of the engine G'. This engine forms the subject-matter of an application now pending in the Patent Office, and a brief description will suffice here. The engine consists of a series of cylinders grouped about a central hollow shaft, G''', that bears the cam-block $G^4$, having in its surface a curved cam, $G^5$, and into this cam-groove the pins $G^6$ on each of the pistons project, and bear against the faces of the cam in such manner and position that the retilinear reciprocating movement of the several pistons and rods is translated into a continued rotation of the cam-block and of the hollow shaft that bears the propeller. The hollow shaft bears a rotary valve, $g$, with inlet-ports $g'$ and outlet-ports $g''$, by means of which the supply of gas to and its exhaust from the engine and into the hollow shaft are controlled as the latter rotates.

The several novel features of this engine are claimed in the application, Serial No. 171,871, above referred to. The strainer $d$ is made by plugging the end of the pipe at any desired point between the flask and the throttle-valve, forming a number of fine perforations, $d'''$, through the wall of the pipe near the end, and inclosing this perforated part in a a larger pipe, forming the chamber $d^4$, that is closed tightly about the pipe D'' at one end of the chamber, while the other opens into the continuation of the pipe D'', that leads to the engine. (See Fig. 30.) The gas in the upper part of the reservoir or flask D' is conveyed by the pipe H to the throttle-controlling cylinder I, and also to the steering-cylinder J, its supply to the former being controlled by a slide-valve, $i$, connected by bell-crank levers to the armature B'' of the electro-magnet B', and to the cylinder J by a slide-valve, $j$, connected by similar bell-crank levers to the armature $k$ of an electro-magnet K.

The gas heating and expanding chambers and their contained mechanism are similar in all respects, and a description of the chamber E' and its mechanism will apply to both. The chamber E' is a closed cylinder of any suitable metal, as copper, made in two or more parts bolted or otherwise fastened together, with openings through the end walls for the passage of the several pipes of the gas-circulating system. The pipe D'' is formed into a coil, D''', within the chamber E' in any desired and convenient form, and is more or less immersed in the liquid, sulphuric acid and water, that forms part of the gas-heating mixture. To the wall of the chamber is attached the lime-tube E'', formed in two or more segments hinged together, so that when opened its contents will be dropped into the solution in the chamber. The parts of the tube are held closed by the bolt $e$, that has several arms, $e'$, each passing through the holes in two or more lugs, that are fast to each of the body parts of the tube, and the latter is sprung open when the bolt is withdrawn by the recoil of the flat springs $e''$, that are placed within the tube, and curved by the closing of the parts of the latter. (See Figs. 7 and 8.) This tube is filled with lime broken into pieces of convenient size to aid its ready mixing with the acid solution, and the tube is opened to dump the lime by the pressure of the gas from the tube H' upon the piston E³, that is movable in the cylinder E⁴, fast to the end wall of the chamber E', the piston being fast to the outer end of the bolt e.

In order to reduce the pressure of the gas formed by the heating-mixture, the chamber E' is provided with a safety-valve, E⁵, on the pipe E⁶, leading from the opening E⁷ in the wall of the chamber, and having a vent through the hull of the boat in any convenient place, as through the brace and standard of the float, as shown in Fig. 2. This safety-valve is of ordinary construction, and needs no detailed description.

The cable which forms the connection between the boat and the station from which it is directed is (in the arrangement of parts as herein described) made up of two insulated wires, one serving as the conductor for operating the valves of the starting and stopping device, and the other being used to operate the steering or guiding devices, which are shown in detail in Figs. 17, 18, and 19. One of these wires, $k'$, is connected to a binding-post, $k''$, of the relay $k'''$, which is connected to the electro-magnet K, and the other end of this wire is connected to a pole-changer at the station, so that the armature of the magnet K can be moved to either pole at will by the movement of a key at the pole-changer. As the armature tilts to one side, the slide-valve $j$ of the cylinder J is moved so as to admit the motive power (the compressed gas) into the end of the cylinder through the port $j'$, and this forces the piston J' forward, moving the rudder J'' to starboard by means of the connecting-rod J³, that is pivoted to one arm of the frame J⁴ of the rudder-post J⁵. This post is stepped in a shoe fast to the bottom of the boat, is widened in the shape of a frame to avoid the hollow shaft G³, projects through the hull at an opening closely protected against leakage by an ordinary packing box, and supports the rudder upon the upper side of the boat. As soon as this valve $j$ is opened, as above described, the gas not only fills into the cylinder, but passes from it by means of the pipe H', that leads to the bolt-tripping cylinders of the lime tubes of the several gas-heating chambers, and by its pressure at once draws the bolts and dumps the lime. By this arrangement of the parts this important operation is performed at will and quickly, and is a feature of our invention. At a convenient point in the line of this pipe H' is placed a cut-off valve, H'', having the inlet $h$, and the passage $h'$ to the pipe $h''$, that is secured in a socket in one side of the valve body $h^3$, and branches right and left into the pipes $h^4\ h^5$, that lead to the bolt-drawing cylinders on the several lime-tubes. Within the valve body $h^3$ is the valve $h^6$, borne on a sliding valve-stem, $h^7$, that bears on the end opposite the valve a piston, $h^8$, that holds between it and the bottom of the cylinder a coiled spring, $h^9$, that holds the inlet open, except when a greater pressure is exerted on the outer end of the piston in the chamber $h^{10}$. Into this chamber $h^{10}$ is led the pipe H''' from the "open" side of the piston in the throttle-operating cylinder I. When the gas flows from the steering-cylinder as already described, through the pipe H', there is no pressure of gas in the chamber $h^{10}$, so that the valve in the cut-off is open for the passage of gas to the bolt-drawing cylinders of the expanding-chambers; but as soon as the throttle is open there is a strong pressure exerted upon the piston $h^8$ by the flow of gas through the pipe H''', and the valve is pushed down so as to close the inlet $h$, and this is held closed so long as the gas is flowing from the throttle-valve to operate the engine. The object of this cut-out valve is to prevent the flow of gas into the heating-chamber every time that the rudder may be moved to starboard in handling the boat. By a movement of the key at the pole-changer the current is broken and the armature is released, which allows the slide-valve of the steering-cylinder to move to the central position (see Fig. 18) under the pull of the spring $j^2$, so coiled about the extension of the valve-stem $j''$ and so seated as to be compressed by the movement of the valve to either side of the center. At the same time the rudder is brought to a central position, or "steady," by the recoil of the spiral-spring J⁶, that is coiled about the piston-rod, and is seated between a collar on the rod and the cap on the tube projecting from the cylinder-head, and the piston is also returned to a central position in the cylinder.

The arrangement of parts by which the return of the valve and the piston to the central position is insured, is substantially the same in each structure. The valve-stem $j''$ slides in a sleeve, $j^4$, that also slides in a socket or bearing in the plug in the end wall of the body of the slide-valve chamber. This sleeve at one end abuts against a shoulder on the valve-stem and at the outer end against a collar or washer, $j^5$, between which and a collar on the outer end of the valve-stem the spring $j'''$ is seated. It will be seen by an examination of Fig. 18 that the spring will be compressed by a movement of the valve to either side of the center, and the recoil of the spring will return it to the same central position from both sides alike. The piston in the steering-cylinder J is returned to central position and the rudder held at "steady" by an arrangement of parts so nearly the same as not to require a detailed explanation to be clear. The extent of play of the rudder is regulated by devices within the cylinder J. The piston-rod extends a short distance through the piston, and bears two nuts that are movable on a thread cut on the piston-rod, and can be set and clamped at varying distances from its face. A recess is cut in the back head of the cylinder large enough to admit the end of the piston-rod, but not the nuts, and the distance the piston will move toward the back head is clearly determined by the position of the set-nuts. A similar pair of set-nuts are adjustable on the rod on the front side of the piston, and a corresponding recess is formed in the back of the front head of the cylinder. By these latter nuts the forward movement of the piston is determined. By moving the key so as to send a current in the reverse direction the armature, valve, piston, and connected parts will be so moved as to throw the rudder to port. Before this starboard movement is effected the armature B″ of the magnet B′ is so moved by a current sent through the wire B‴ from the station as to move the slide-valve $i$, which opens the throttle-valve $d'$ in the supply-pipe D″, from the reservoir to the heating-chambers. This movement allows the gas from the upper part of the reservoir to pass in the tube H to the cylinder I, throught that and into the tube H′, by which it is conveyed to the cut-off valve $h''$. This valve-operating mechanism of battery at the station, pole-changer, relay, electro-magnet, conducting-wire, and valve-connecting levers is the same for both the above-described purposes, and is not new with us, it having been substantially shown and described in prior patents.

In order to allow the liquid to be forced into the pipe D″ and the gas from the reservoir into the pipe H, the cocks $l$ and $l'$ in the plug L must first be opened, and this is done by hand before the boat is launched from the station or started from it.

*The Safety Device.*—The firing bar or pin A′ (see Fig. 28) projects from the pointed bow of the boat a short distance, and it has a limited sliding movement in a tube, A″, that extends completely through the magazine from the extreme bow to and through the closed bulk-head that separates the magazine from the next compartment. This pin is held out by a stout string, A‴, suitably seated, (see Fig. 2,) and when it is pushed inward, as by striking an object in motion, the rear end of the pin is thrust between the points $a'$ and connects them. These points are in the circuit of the local battery $a$, the wire $a''$ having one other break at the posts $a^3$ $a^4$, which are held in an insulated block, $a^5$, with the projecting ends on the same plane, so that they are joined when the disk $a^7$ on the end of the rod $a^8$ is pressed against them. These posts are seated on springs $a^{10}$, so as to insure contact with the disk in case of any slight displacement or irregularity in the face of the latter. The rod $a^8$ is fast to a piston in a cylinder, $a^9$, (see Fig. 4,) that is fast to the bulk-head or hull of the boat, and a branch from the pipe D″ on the engine side of the throttle-valve leads to this cylinder $a^9$. The result is that as soon as the throttle-valve is opened and the gas used to move the engine a pressure is exerted on the piston in this cylinder $a^9$ and the disk on the outer end of the piston-rod pressed against the posts so as to close the break. This latter break is closed as long as the engine is in operation; but as soon as the throttle is shut or the pressure of the gas exhausted the boat is stopped and the break again opened by the recoil of the spring $a^{10}$.

When the engine is in operation, the pushing in of the firing-pin completes the local-battery circuit and fires the fuse $a^{12}$, thus exploding the charge; but when the engine has stopped the safety-break is made in the circuit, and the boat can be handled with no danger of the accidental explosion of the charge.

The several circuits of the starting-wire and steering-wire are completed by connection to the boat at one end and to a submerged plate at the station, in the ordinary manner.

In order to protect the boat from injury from projectiles that may be fired at it, it is submerged a short distance, (about three feet,) and is held at the desired depth by means of the float M, that is secured to standards or braces $m$ rising from the upper side of the boat. This float is similar in shape to the boat, is somewhat longer than it, and is filled with cork, cellulose, or a great number of inflated rubber bags, which are very buoyant and will not be washed out of the float even when the latter is pierced and riddled with balls. The usual guide-rods project from the upper side of the float and bear flags to indicate its position and direction. The cable is paid out from the cable-chamber through the hollow propeller-shaft in the ordinary manner as the boat moves away from the station or starting-point. The float overhangs the stern of the boat and the propeller, and thus prevents the latter from pulling the stern down and lifting the bow out of water, and the drag $m'$, fast to the bow of the float on the end of the standard $m''$, aids in preventing the boat from diving, the object being to insure a horizontal position and motion of the boat in action in the water. The long float serves to support the boat with the charge of explosive at a depth below the surface of the water, that will make its explosion surely effective. The firing pin or bolt is shut out from the magazine-chamber, and the advantage of this is that the charge can be packed well into the bow of the boat without danger of accidental explosion, which would be caused by such contact with the pin, if uncovered, and the wires as would form an electrical connection and ignite the fuse.

In Figs. 33 to 37 is shown an alternate form of reel and devices for unwinding the cable as the boat moves forward. The letter N denotes the reel, that is made up of any convenient material, with flanges $n'$ $n''$ and barrel $n'''$, that is perforated through the center for the passage of a shaft used in winding on the cable. The flange $n'$ has near its outer edge several open slots, $n^4$, that are used in securing it to the bulk-head F′ of the cable-chamber, as by means of bolts and nuts. The reel is held in a position lengthwise of the boat, and the cable is delivered from it over the edge of the flange $n''$, that flares slightly outward, and through a curved guide, $n^5$, that is fast to the outer end of a flier, $n^6$, that is attached to the stem $n^7$ on the reel, so as to revolve freely, but has only little play in the line of the axis of the reel. The hub of the flier is held between a collar next the flange $n''$ and a spring, $n^8$, coiled about the stem and pressed against it by the set-nuts $n^9$. The office of this device is to hold the flier with an adjustable yielding pressure strong enough to prevent the cable from unwinching by recoil. From the reel the cable is led through the hollow valve-stem to the stern of the boat and out of the tubular shaft beyond the propeller $G''$, passing through the stop-valve O in the shaft. This stop-valve prevents the water from flowing into the boat through the engine and its valves, and it consists of the disk $o$, fast to the stem $o'$ and fitting on the seat $o''$, against which it is held by the pull of the spring $o'''$, that is seated between the lug $o^4$ on the inner surface of the tube and the back of the ring $o^5$, to which the valve-stem is secured by its flaring arms $o^6$. On the outer side of the valve-seat the elastic packing-disk $o^7$ is attached to the valve-disk, with the cable passing through its central part, which extends outward along the cable, so that the pressure of the water about it will cause it to hug the cable closely. The outer end of the valve-stem is supported by a spider in a similar manner to the inner end. The pressure of the exhaust is sufficient to open this valve against the pressure of the water and the force of the spring, and the pull of the cable holds it open when the boat is in motion; but when the boat stops the valve closes at once, which gives us the advantage of freedom from water in the engine.

Another advantage of our invention resides in the safety device located on the engine side of the throttle-valve, so as to make the explosion of the charge impossible except when the boat is running under pressure, the closing of the throttle-valve or exhaustion of the pressure of the gas opening the safety-break in the circuit of the battery used to fire the charge.

By the use of a strainer in the tube conveying the liquefied gas from the flask to the heating-chambers, any chance clogging up of the throttle and other valves by sediment is avoided.

No specific claim is made in this application for the gas heating and expanding chamber, the partible chamber secured within the gas heating and expanding chamber, the means for opening and closing the partible chamber, and the strainer $d$, composed of the chamber $d^4$, fixed to the supply-pipe, as the same form the subject-matter of another application for Letters Patent, Serial No. 194,931, filed March 11, 1886.

We claim as our invention—

1. In combination with a submerged torpedo-boat, a pointed cylindrical float with its stern overhanging the stern and propeller of the boat and with its bow projected beyond midships, all substantially as described.

2. In combination with a submerged torpedo-boat, a surface-float with its stern overhanging the stern and propeller of the boat, all substantially as described.

3. In combination with a submerged boat, a surface float with its stern overhanging the stern and propeller of the boat and its bow bearing a drag to prevent diving, all substantially as described.

4. In combination with the submerged boat, the surface-float bearing on a standard the tilting drag having a limited motion in a vertical plane, all substantially as described.

5. In a torpedo-boat the firing-pin inclosed within a tube extending entirely through the magazine and protected from contact with its contents, all substantially as described.

6. In combination with the sliding firing-pin of the torpedo-boat, the local battery within the boat, the break in its circuit closed by the movement of the firing-pin at the inner end of its play, and the safety-break closed through suitable means by the gaseous motive power running the engine, all substantially as described.

7. In combination with the sliding firing-pin of the torpedo-boat, the battery-circuit with a break opened and closed by the movement of the firing-pin and a safety-break opened by the pressure of the motive power running the engine, taken from the engine side of the throttle-valve, all substantially as described.

8. In combination with the battery-circuit, the firing-pin $A'$, the points $a'$, adapted to be joined by the inward movement of the pin, the spring seated posts $a^3 a^4$, and the rod $a^8$, bearing the disk $a^7$ and fast to a piston in the cylinder $a^9$ on the branch from the supply-pipe $D''$, all substantially as described.

9. In a boat propelled by the expansion of gas or fluid, the gas-heating chamber, the partible lime-tube within the chamber, the spring for opening said tube, and a device connecting the lock of the tube with the gas-supply, whereby the tube is opened and the lime is dumped automatically by the opening of a valve in the steering-cylinder, all substantially as described.

10. In combination, in a boat propelled by the expansion of gas or fluid, the pipe system connecting with the valves of the starting and steering cylinders, the cut-off valve interposed between the steering-cylinder and the pipes branching to the unlocking cylinders of the lime-tubes, all substantially as described.

11. In a boat propelled by the expansion of gas or the like fluid, the reservoir, the heating and expanding chambers, the pipe system, the starting and stopping cylinder and its connected valves, the steering-cylinder with its valves, and the cut-off valve $H''$, interposed between the steering-cylinder and the branched pipes to the several heating-chambers of the pipe leading from the opening side of the starting-cylinder and the closing-chamber of the cut-off valve, all substantially as described.

12. In combination with the electrical devices for opening and closing the slide-valve of the steering-cylinder, the spring $j^3$, held between the shoulders on the valve-stem and collar on the inner end of the stem, whereby the spring is compressed by a movement of the valve in opening the ports to both sides of the piston, and by its recoil closes the ports, all substantially as described.

13. In combination with the rudder-post and connecting-rods, the piston-rods of the steering-cylinder bearing on both sides of the piston, the adjustable set-nuts, and the cylinder-heads with the inward-opening sockets, all substantially as described.

14. In a torpedo-boat, the magazine, as A, provided with a fixed tube, as $A''$, having its ends fixed in the bow and through the bulk-head of the magazine, in combination with the firing-pin having its stem projected through the said tube into the firing-chamber, substantially as described.

GEORGE E. HAIGHT.
WILLIAM H. WOOD.

Witnesses:
CHAS. L. BURDETT,
H. R. WILLIAMS.